Patented Aug. 16, 1938

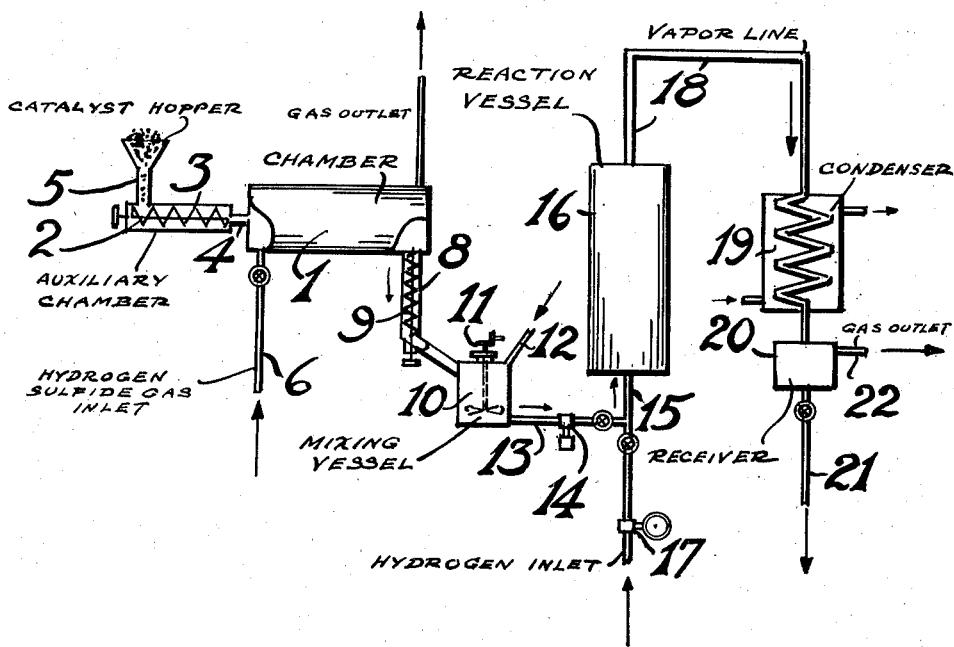

2,127,383

UNITED STATES PATENT OFFICE 2,127,383

CARRYING OUT CATALYTIC REACTIONS

Mathias Pier, Heidelberg, and Paul Jacob and Walter Simon, Ludwigshafen-on-the-Rhine, Germany, assignors to Standard-I. G. Company, Linden, N. J., a corporation of Delaware Application April 25, 1936, Serial No. 76,428
In Germany January 30, 1931

9 Claims. (Cl. 196—52)

The present invention is a continuation-in-part of our copending application Serial No. 586,948, filed January 15, 1932, now Patent No. 2,038,599, granted April 28, 1936, which relates to improvements in carrying out catalytic reactions, in particular the destructive hydrogenation of carbonaceous materials.

In the said Patent No. 2,038,599 a process is claimed according to which catalytic reactions, in particular the destructive hydrogenation of combustible carbonaceous materials which takes place at a temperature between 300° and 700° C. and under superatmospheric pressure, are effected in the presence, as catalysts, of sulphides of heavy metals, other than iron, which, during and after their preparation are precluded from substances having a substantial oxidizing action and which have been prepared by treating heavy metals or their compounds with sulphidizing agents at temperatures between 150° and 700° C., added free hydrogen being present if at all, in amounts not exceeding 10 per cent of the entire amounts of volatile constituents and the treatment, at least for a substantial portion thereof being carried out under a pressure of at least two atmospheres and being continued until no further sulphur is absorbed from the sulphidizing agent by the material undergoing treatment.

A modification of the said invention consists in the preparation and the use of catalysts which have been prepared by imparting the said sulphidizing treatment to sulphides, as for example commercial sulphides, such as sulphides obtained by precipitation with hydrogen sulphide or a solution of ammonium sulphide from solutions of metal salts. When starting from these sulphides the said sulphidizing treatment may also be effected under ordinary pressure.

The present invention relates to this modification of the invention described in the said Patent No. 2,038,599, and may be fully understood from the following specification thereof when read in conjunction with the accompanying drawing.

In the drawing, the numeral 1 designates a chamber for preparation of a catalyst by treatment with hydrogen sulphide as later described. Catalyst is supplied to the chamber by means of a screw conveyor 2 in an auxiliary chamber 3 connected to the chamber 1 by means of a passageway 4, and having a hopper 5 for the introduction of the raw catalytic material. A stream of hydrogen sulphide gas is passed through the chamber 1 by means of inlet line 6 and outlet line 7.

The treated material in chamber 1 is withdrawn therefrom by the conduit 8 in which is disposed a screw conveyor 9. The conduit 8 discharges into a mixing vessel 10 equipped with a stirring mechanism 11. An inlet 12 is provided in the mixing vessel through which oil may be fed into the system. The mixture of oil and the treated catalyst is withdrawn from the mixing vessel 10 by means of line 13, pump 14 and line 15, into a heated reaction vessel 16. Hydrogen is supplied to the vessel 16 by means of pump 17 and line 15. Vapor reaction products are withdrawn from the vessel 16 by means of line 18 through the condenser 19. The condenser 19 discharges into a receiver 20 from which liquid products are withdrawn by means of line 21, the uncondensed gaseous material being withdrawn through line 22.

As mentioned above, commercial sulphides, as for example those obtained by precipitation with hydrogen sulphide or a solution of ammonium sulphide from solutions of metal salts may be employed as starting materials for the preparation of the desired catalysts; but also sulphides prepared in any other manner come into consideration. As initial sulphides to be improved by the said sulphidizing treatment are very suitable those of the metals from groups 2 to 8 of the periodic system and especially of heavy metals from these groups, as for example the sulphides of zinc, titanium, chromium, molybdenum, tungsten, uranium, vanadium, manganese, iron, cobalt or nickel.

If the sulphidizing treatment is effected under superatmospheric pressures, pressures ranging above 2 atmospheres, such as those between 3 and 15 particularly come into consideration, but the treatment may also be carried out at pressures above 15 atmospheres or at between atmospheric pressure and 2 atmospheres.

As sulphidizing agents are employed liquid or volatilized sulphur or volatile divalent sulphur compounds, if desired together with, preferably small amounts of hydrogen or with other extraneous gases, such as nitrogen, carbon monoxide or carbon dioxide, or also gas mixtures which under the conditions of operation yield sulphur or divalent sulphur compounds, as for example mixtures of sulphur dioxide and hydrogen.

The improvement, as regards catalytic activity, of the metal sulphides by the said treatment with sulphidizing agents is particularly pronounced with metal sulphides other than iron sulphide, but also iron sulphide is improved by the said sulphidizing treatment.

The treatment of the said metal sulphides is preferably carried out by compressing volatile sulphur compounds, such as hydrogen sulphide, carbon disulphide and the like, either alone or in admixture with each other or with gases other than those comprising free oxygen or splitting off oxygen under the conditions of operation, such as steam, and preferably in the absence of hydrogen in amounts larger than 10 per cent, at room temperature or elevated temperature and allowing them to flow over or through the said metals or metal compounds at elevated temperature, as for example between 150° and 700° C. preferably between 300° and 600° C. sulphur, especially in the vaporized form, may be used instead of volatile sulphur compounds. The sulphur which remains unused after the treatment may be removed by leading thereover hydrogen or other gases. Sometimes it is also preferable to carry out after this operation a treatment with volatile compounds of divalent sulphur, especially hydrogen sulphide. Sometimes it is advantageous to expose the initial metal sulphide to the vapors or gases containing elementary or combined sulphur in as finely ground a state as possible. But the material to be treated may also be present in other forms, as for example in the form of plates, sticks, nets, cubes, rings or star-shaped bodies as may appear most suitable for the catalytic reaction. Sometimes it may be advantageous to employ the catalyst materials in the form of frothy structures which may be obtained by adding substances evolving gases during the preparation of the catalyst such as ammonium carbonate or ammonium nitrite. The material to be treated may be kept in motion, as for example by stirrers, spirals, paddles or shaking grates.

It has been found to be preferable to vary the temperature and/or the pressure during the treatment, which may be effected by increasing or decreasing the temperature and/or the pressure; for example the temperature may be slowly raised from 300° to 400° C. while the pressure is maintained at 10 atmospheres or slowly raised from 2 to 15 or 50 atmospheres. When working with hydrogen sulphide pressures between 2 and 15 atmospheres are suitable. But also pressures up to 100, 150, 200 and 1000 atmospheres may be employed when high pressure vessels are available for the treatment of the catalyst. If the treatment with sulphur or volatile sulphur compounds is carried out under pressures higher than from 5 to 10 atmospheres it requires a shorter reaction period than when a pressure of only 2 atmospheres is employed. The catalyst may also be treated with sulphur or volatile sulphur compounds first at rising temperatures without the employment of pressure and then further treated under increased or increasing pressure at the same or a raised temperature or rising temperatures. For example, the catalyst may be treated with hydrogen sulphide first by heating in the course of from 3 to 70 hours, preferably from 3 to 50 hours, from 150° to 300° or up to 400° C. under atmospheric pressure and then heating at 400° or 500° C. under a pressure of 10 or 15 atmospheres or at pressures rising in the course of 2 to 24 hours from 2 up to 20 atmospheres; or the catalyst may be heated in the presence of hydrogen sulphide under atmospheric pressure up to 300° C. and then further up to 415° C. under pressures of between 5 and 10 atmospheres or rising from 1 to 10 or from 1 to 15 or more atmospheres.

The treatment of the initial metal sulphides may be effected in the same reaction chamber in which the catalytic reaction itself is carried out later on. It is not necessary to bring the material to be treated into the shape desired for the catalytic reaction before the sulphidizing treatment, because the shape may be subsequently imparted to the metal sulphide produced, for example by a pressing treatment or any other mechanical means. The catalyst materials may be employed in a rigid arrangement as plates, rings, sieves, cylinders or as coarse or fine grained materials between wire netting, or they may be introduced into the reaction vessel in the form of lumps or small cubes which may lie irregularly or in a regular arrangement on sieves or similar supporting devices.

The catalysts so produced may have added to them other substances which may act catalytically themselves, or as carriers or simultaneously as catalysts and carriers and which do not split off free oxygen under the working conditions, in particular together with sulphides obtained in a manner different from that described above, for example those obtained by interaction, at elevated temperatures, but under ordinary pressure, of metals or metal oxides and sulphur or divalent sulphur compounds. Also other substances, if desired, before the sulphidizing treatment may be added, for example difficultly reducible metal oxides, such as zinc oxide, titanium oxide, and alumina, or chromium oxide, magnesia, magnesite, furthermore active carbon, active silica, active alumina, bentonite, Florida earth, pumice. If carriers are employed the catalytic material may be applied to them either before or after the sulphurizing treatment. The sulphides obtained according to the present invention may also be mixed with metals, preferably in a finely divided state, such as aluminium, magnesium, silicon, tungsten, molybdenum, and then mechanically pressed together, if desired. A catalyst prepared from about 80 parts of metal sulphide, as for example tungsten sulphide and about 20 per cent of metal powder, such as aluminium powder has proved to be of particular advantage.

The catalysts according to the present invention are eminently active in the production of valuable hydrocarbons by the destructive hydrogenation of coals, tars, mineral oils, their distillation, extraction and conversion products and residues with hydrogen or gases having a reducing action which contain combined hydrogen, especially in a flowing condition, at elevated temperatures, in particular those ranging between 300° and 700° C. and under pressure, preferably above 50 atmospheres, or also in the cracking of liquid carbonaceous materials. The result may be the splitting up of the initial materials with the addition of hydrogen or the conversion of aliphatic hydrocarbons into aromatic or the simple refining of the initial materials, as for example crude benzene. Other catalytic reactions, such as the purification of gases by treatment with hydrogen, the preparation of methanol or hydrocarbons from carbon monoxide and hydrogen, the purification, especially the desulphurization, of carbonaceous substances (tar oils, mineral oils, fractions thereof such as crude benzol and the like) with hydrogen, preferably under pressure, the preparation of hydrogen sulphide from its elements, the hydrogenation of unsaturated and aromatic hydrocarbons, the dehydrogenation of hydrocarbons, the preparation of hydrogen or polymerization products from the waste gases from destructive hydrogenations or cracking gases and the like, may also be carried out with the said catalysts.

The catalysts obtainable according to the present invention are of particular advantage for the treatment of materials containing sulphur and which are free from oxygen. With materials containing oxygen, such as those containing phenols, it is of advantage to continuously add to the hydrogenating gas sulphur or divalent sulphur compounds, as for example hydrogen sulphide or carbon disulphide. It is also of advantage to mix sulphur with the initial materials.

According to the present invention the reaction chambers, for example, in the destructive hydrogenation of coals, tars, mineral oils and the like, may be subjected to high throughputs of the materials to be treated per unit of time without the yields of valuable products being injuriously affected. Thus the yield of useful hydrocarbon products obtained with the catalysts in accordance with the present invention is often 5 to 10 times as high as when working under otherwise like conditions and with the same high throughput with a catalyst prepared from molybdic acid and magnesium oxide. The catalysts have the further advantage that, for example, the destructive hydrogenation may be carried out at lower temperatures, as for example from 50° to 70° C. or more lower, than when employing sulphides from the usual sources, and with the same throughputs whereby the formation of gaseous hydrocarbons is prevented to a large extent. The resulting middle oils and products of higher boiling point are rich in hydrogen and may be advantageously worked up into illuminating oils, Diesel oils or lubricating oils; they may also be subjected to a cracking process or returned to the reaction chamber and may readily be split into valuable products of lower boiling point by reason of their high content of hydrogen.

The resulting benzines may be improved, when necessary, as regards their knocking properties by converting a fraction thereof into aromatic substances, for example by destructive hydrogenation above 500° C. and adding it to the main fraction again. The said catalysts, by reason of their good hydrogenating action, may be employed with special advantage for converting initial materials poor in hydrogen which are unsuitable for the preparation of benzine by destructive hydrogenation or cracking into products rich in hydrogen, even at comparatively low temperatures, as for example from 300° to 350° C., if desired without appreciable splitting.

In the same way, hydrocarbons containing oxygen or sulphur may be freed by means of the said catalysts in the presence of hydrogen from oxygen and sulphur (which treatment is also called hydrofining) and, if desired, subjected to a cracking, if desired in the presence of hydrogen.

The preparation of illuminating oils and lubricating oils by destructive hydrogenation may also be carried out with the said catalysts with substantially greater throughputs than with the catalysts hitherto known.

The sulphides prepared according to the present invention are entirely free from oxygen. No oxygen can be found therein by analytical methods. It is believed that these catalysts are even free from small traces of oxygen which cannot be detected by the minutest methods of analysis. This assumption is supported by the fact that if these catalysts are exposed to the air at ordinary temperature their activity begins to slowly decrease after a course of several days and that if stored in the presence of air for several weeks their activity becomes equal to that of the catalysts obtainable according to the hitherto usual methods, for example by converting metal oxides, such as tungsten oxide, with hydrogen sulphide at ordinary pressure. In the thus stored catalysts oxygen cannot be detected by analytical methods, but it may be that very small traces of oxygen from the air have been combined with or occluded to the catalytic mass. However, we wish to be understood that we do not restrict ourselves to this theory.

We have found that the above mentioned decrease in the catalytic activity of the catalysts obtained according to the present invention does not occur if these catalysts are precluded also after the preparation from free oxygen or substances having a substantial oxidizing effect. By "substances having a substantial oxidizing effect" we understand also air under atmospheric temperature if it is allowed to be in contact with the catalysts for a long time, as for example several days or more.

The following examples will further illustrate the nature of this invention but the invention is not restricted to these examples.

*Example 1*

Over a tungsten sulphide prepared from tungsten oxide and sulphur and which still contains small amounts of oxy sulphide hydrogen sulphide is led at about 400° C. for about 48 hours. The resulting substance which is free from oxy sulphide is then shaped into pieces and arranged rigidly in a high-pressure chamber. If a middle oil obtained by the destructive hydrogenation of mineral coal low temperature tar be led together with hydrogen under a pressure of 250 atmospheres over the said catalyst at 430° C., a product is obtained consisting up to the extent of 50 per cent of constituents boiling up to 180° C. The remainder may be employed as a Diesel oil.

*Example 2*

By subjecting American crude oil containing 3 per cent of resins and 5 per cent of asphalt to fractional distillation with steam in vacuo a fraction boiling above 325° C. which is free from asphalt is obtained. This fraction is passed in the liquid state together with hydrogen at 410° C. and under a pressure of 220 atmospheres over a catalyst consisting of cobalt sulphide prepared in the manner described below and which is rigidly arranged in the reaction vessel. A lubricating oil having a satisfactory temperature viscosity curve and a low coke test is thus obtained.

The cobalt sulphide employed is obtained by precipitation from an aqueous solution of a cobalt salt by means of an aqueous solution of ammonium sulphide, filtering off the precipitate formed and subsequently treating it with hydrogen sulphide at 300° C. for about 4 to 8 hours.

Similar results are obtained by employing for the above treatment one or more of the sulphides of vanadium, molybdenum, chromium or nickel treated with hydrogen sulphide or a carbonaceous sulphur compound for several hours and while excluding air, at a temperature between 300° and 400° C. for about 5 to 8 hours.

*Example 3*

Iron sulphide which has been produced by precipitation from an iron chloride solution with aqueous ammonium sulphide solution, is packed in lump form into a reaction vessel and treated during 12 hours with hydrogen sulphide at a temperature of 200° C. Hydrogen is then led together with the vapors of a gas oil over the catalyst under a pressure of 200 atmospheres and at a temperature of 470° C. A product is thereby obtained, which contains 37 per cent of hydrocarbons boiling up to 180° C. The product can be converted entirely into benzine if the higher boiling fractions are recycled.

Example 4

Cobalt sulphide prepared by precipitation from a solution of cobalt nitrate with a solution of ammonium sulphide is rigidly arranged in the form of pieces in a reaction vessel and then treated for 12 hours with hydrogen sulphide at a temperature of 200° C. Hydrogen is then led together with the vapors of a gas oil at a temperature of 470° C. and under a pressure of 200 atmospheres over the thus prepared catalyst. In this manner a product is obtained containing 43 per cent of constituents boiling up to 180° C. When recycling the middle oil fraction of this product the initial gas oil may be completely converted into benzine.

Example 5

Commercial iron sulphide prepared by precipitation from a solution of an iron salt with a solution of ammonium sulphide is treated in the dry state at 430° C. under a pressure of 10 atmospheres for 3 hours with hydrogen sulphide. When passing a brown coal tar middle oil together with hydrogen at 475° C. and under a pressure of 200 atmospheres over the catalyst thus prepared a product is obtained of which 40 per cent boil within the boiling point range of benzine. At the same time 90 per cent of the phenols present in the initial oil are reduced.

Example 6

Commercial tungsten sulphide obtained by precipitation from a solution of a tungsten salt with hydrogen sulphide is arranged in the form of pieces in a high pressure vessel and treated therein at 200° C. for about 3 hours with hydrogen sulphide. Thereupon hydrogen is passed together with the vapors of a middle oil, obtained by distillation of a mineral oil, which maintaining a pressure of 200 atmospheres and a temperature of 430° C. In this manner a product containing 65 per cent of benzine is formed.

If the same middle oil is passed together with hydrogen containing 2 per cent of hydrogen sulphide under otherwise the same conditions over pieces of commercial tungsten sulphide which has not previously been treated with hydrogen sulphide a product is formed which contains only 58 per cent of benzine.

Example 7

Vanadium sulphide obtained by passing hydrogen sulphide into a saturated solution of ammonium vanadate is treated with hydrogen sulphide for 12 hours at a temperature of 400° C. and under a pressure of 5 atmospheres. Over the catalyst thus obtained the vapors of a middle oil obtained by destructive hydrogenation of a mineral coal low temperature distillation tar are passed together with hydrogen under a pressure of 250 atmospheres and at a temperature of 440° C. In this manner a product is obtained of which 45 per cent boil up to 180° C.

What we claim is:—

1. In carrying out catalytic reactions at elevated temperatures with combustible carbonaceous materials, the step which comprises employing as a catalyst a sulfide of a metal of the sixth group which during and after its preparation is precluded from substances having a substantially oxidizing action and which is prepared by treating a sulfide of a material selected from the group consisting of sixth group metals with a sulfidizing agent for from 3 to 70 hours at a temperature between about 410 and 450° C. and under a pressure of from about 2 to about 15 atmospheres, added free hydrogen being present, if at all, in amounts not exceeding 10% of the entire amount of volatile constituents.

2. In the destructive hydrogenation of carbonaceous materials, at a temperature between 300° C. and 700° C. and under superatmospheric pressure, the step which comprises employing as a catalyst a sulfide of a metal of group six of the periodic system which, during and after its preparation, is precluded from substances which having substantial oxidizing action and which is prepared by treating a sulfide of a material selected from the group consisting of metals of group six with hydrogen sulfide at a temperature between 300° C. and 600° C., added free hydrogen being present, if at all, in amounts not exceeding 10% of the entire amount of volatile constituents, and the treatment, at least for a substantial portion thereof, being carried out under a pressure of at least two atmospheres and being continued until no further sulfur is absorbed from the hydrogen sulfide by the material undergoing treatment.

3. In carrying out catalytic reactions at elevated temperatures with combustible carbonaceous materials, the step which comprises employing as a catalyst a sulfide of a heavy metal, other than iron, which, during and after its preparation is precluded from substances having a substantial oxidizing action and which is prepared by treating a sulfide of a material selected from the group consisting of heavy metals with a sulfidizing agent at a temperature between 150° C. and 700° C., added free hydrogen being present, if at all, in amounts not exceeding 10% of the entire amount of volatile constituents, and the treatment being continued until no further sulfur is absorbed from the sulphidizing agent by the material undergoing treatment.

4. In carrying out catalytic reactions at elevated temperatures with combustible carbonaceous materials, the step which comprises employing as a catalyst, a sulfide of a heavy metal, which, during and after its preparation is precluded from substances having a substantial oxidizing action and which is prepared by treating a sulfide of a material selected from the group consisting of heavy metals with a sulfidizing agent at a temperature between 150° C. and 700° C., added free hydrogen being present, if at all, in amounts not exceeding 10% of the entire amount of volatile constituents, and the treatment being continued until no further sulfur is absorbed from the sulphidizing agent by the material undergoing treatment.

5. The process according to claim 4, in which the catalytic reaction is a destructive hydrogenation conducted at a temperature between 300 and 700° C. and under superatmospheric pressure.

6. The process according to claim 4 in which the sulfidizing agent is hydrogen sulfide.

7. In carrying out catalytic reactions at elevated temperatures with combustible carbonaceous materials, the step which comprises employing as a catalyst, a sulfide of a heavy metal from Groups V to VIII of the periodic system, which, during and after its preparation is precluded from substances having a substantial oxidizing action and which is prepared by treating a sulfide of a material selected from the group of heavy metals from Groups V to VIII of the periodic system, with a sulfidizing agent at a temperature between 150° C. and 700° C., added free hydrogen being present, if at all, in amounts not exceeding 10% of the entire amount of volatile constituents and the treatment being carried out under superatmospheric pressure and being continued until no further sulfur is absorbed from the sulfidizing agent by the material undergoing treatment.

8. The process according to claim 4 in which the said sulfide of a material selected from the group consisting of heavy metals is a sulfide of tungsten.

9. The process according to claim 4 in which the said sulfide of a material selected from the group consisting of heavy metals is a sulfide of molybdenum.

MATHIAS PIER.
PAUL JACOB.
WALTER SIMON.